(12) United States Patent
Yano

(10) Patent No.: US 8,817,446 B2
(45) Date of Patent: Aug. 26, 2014

(54) ELECTRONIC DEVICE

(75) Inventor: Junya Yano, Yokohama (JP)

(73) Assignee: Kyocera Corporation, Kyoto (JP)

( * ) Notice: Subject to any disclaimer, the term of this patent is extended or adjusted under 35 U.S.C. 154(b) by 907 days.

(21) Appl. No.: 12/994,619

(22) PCT Filed: May 29, 2009

(86) PCT No.: PCT/JP2009/059879
§ 371 (c)(1),
(2), (4) Date: Dec. 29, 2010

(87) PCT Pub. No.: WO2009/145305
PCT Pub. Date: Dec. 3, 2009

(65) Prior Publication Data
US 2011/0096482 A1    Apr. 28, 2011

(30) Foreign Application Priority Data

May 29, 2008  (JP) .................................. 2008-140332
Jan. 28, 2009  (JP) .................................. 2009-017383

(51) Int. Cl.
*H01H 47/00*  (2006.01)
(52) U.S. Cl.
USPC ........................................................ 361/170
(58) Field of Classification Search
USPC ........................................................ 361/170
See application file for complete search history.

(56) References Cited

U.S. PATENT DOCUMENTS

| 7,059,182 | B1 * | 6/2006 | Ragner ........................... 73/200 |
| 7,350,394 | B1 * | 4/2008 | Flynn et al. .................... 73/1.38 |
| 7,450,332 | B2 * | 11/2008 | Pasolini et al. ................. 360/75 |
| 2009/0035612 | A1 | 2/2009 | Suematsu et al. |

FOREIGN PATENT DOCUMENTS

| JP | 4-60956 | | 5/1992 |
| JP | 5-143551 | A | 6/1993 |
| JP | 7-130115 | A | 5/1995 |
| JP | 9-212462 | A | 8/1997 |
| JP | 11-225188 | A | 8/1999 |
| JP | 2004-128547 | A | 4/2004 |
| JP | 2004-247217 | A | 9/2004 |
| JP | 2006-189555 | A | 7/2006 |
| JP | 2006-254207 | A | 9/2006 |
| JP | 2006-273683 | A | 10/2006 |
| JP | 2006-292945 | A | 10/2006 |
| JP | 2006-352533 | A | 12/2006 |
| JP | 2007035445 | A | 2/2007 |

(Continued)

OTHER PUBLICATIONS

Notice of Reasons for Rejection issued to JP Application No. 2008-140332, mailed Nov. 15, 2011.

(Continued)

*Primary Examiner* — Stephen W Jackson
(74) *Attorney, Agent, or Firm* — Hoffmann & Baron, LLP

(57) ABSTRACT

Provided is an electronic device which can reduce possibility of generation of a secondary damage on an electronic circuit caused by a shock. A mobile telephone includes a case, an electronic circuit block mounted on the case, an acceleration sensor which measures an acceleration of the case, and a CPU. The CPU has a detection unit which detects a level of a shock applied to the case according to the acceleration value measured by the acceleration sensor and a control unit which limits electric communication to the electronic circuit block according to the detected shock level.

13 Claims, 13 Drawing Sheets

(56) References Cited

FOREIGN PATENT DOCUMENTS

| JP | 2007-59014 A | 3/2007 |
|---|---|---|
| JP | 2007-80630 A | 3/2007 |
| JP | 2007-151948 A | 6/2007 |
| JP | 2007-300650 A | 11/2007 |
| JP | 2005-249708 | 9/2009 |
| WO | 2007/013668 A1 | 1/2007 |

OTHER PUBLICATIONS

Notice of Reasons for Rejection issued to JP Application No. 2009-017383, mailed Apr. 16, 2013.
Decision issued to JP Application No. 2009-017383, mailed Aug. 6, 2013.
Inquiry issued to JP Application No. 2009-017383, mailed Jan. 14, 2014.

* cited by examiner

FIG. 3

IMPACT JUDGMENT TABLE

| FOLDING STATE | IMPACT DIRECTION (x : y/x : z/x) | IMPACT LEVEL A | | IMPACT LEVEL B | |
|---|---|---|---|---|---|
| | | MAGNITUDE ($G^2$) | SUSTAINED TIME (mSec) | MAGNITUDE ($G^2$) | SUSTAINED TIME (mSec) |
| OPEN | 1.00 : 1.60 ~ 1.40 : -1.90 ~ -2.10 | 1,200,000 | 300 | 4,800,000 | 300 |
| OPEN | 1.00 : -2.10 ~ -2.30 : 1.40 ~ 1.20 | 820,000 | 120 | 3,600,000 | 120 |
| ... | ... | ... | ... | ... | ... |
| FOLDED | 1.00 : 1.60 ~ 1.40 : -1.90 ~ -2.10 | 2,100,000 | 300 | 4,100,000 | 300 |
| FOLDED | 1.00 : -2.10 ~ -2.30 : 1.40 ~ 1.20 | 1,600,000 | 120 | 4,500,000 | 120 |
| ... | ... | ... | ... | ... | ... |

FIG. 4

LIMITATION CONTENT TABLE

| CIRCUIT BLOCK | IMPACT LEVEL A | | IMPACT LEVEL B | |
|---|---|---|---|---|
| | LIMITED OBJECT 1 | LIMITATION CONTENT a | LIMITED OBJECT 2 | LIMITATION CONTENT b |
| CHARGE CIRCUIT | LIMITED | INHIBITED | LIMITED | INHIBITED |
| MOTOR | LIMITED | INHIBITED | LIMITED | INHIBITED |
| OLED | NOT LIMITED | — | LIMITED | INHIBITED |
| LED | NOT LIMITED | — | LIMITED | VOLTAGE RISE INHIBITED (LOW LIGHTING MODE) |

FIG. 5

NOTIFICATION CONTENT TABLE

| CIRCUIT BLOCK CONTROL EVENT | IMPACT LEVEL A | | IMPACT LEVEL B | |
|---|---|---|---|---|
| | LIMITED OBJECT 1 | NOTIFICATION CONTENT I | LIMITED OBJECT 2 | NOTIFICATION CONTENT II |
| (IMMEDIATELY AFTER DETECTION) | — | A STRONG IMPACT IS DETECTED. SERIOUS SECONDARY DAMAGE MAY FURTHER OCCUR. PLEASE HAVE YOUR PHONE INSPECTED IMMEDIATELY AT THE NEAREST SERVICE CENTER. | — | A STRONG IMPACT IS DETECTED. SERIOUS SECONDARY DAMAGE MAY FURTHER OCCUR. PLEASE HAVE YOUR PHONE INSPECTED IMMEDIATELY AT THE NEAREST SERVICE CENTER. |
| CHARGE CIRCUIT | LIMITED | SINCE A SERIOUS SECONDARY DAMAGE MAY OCCUR, THIS FUNCTION IS LIMITED. | LIMITED | SINCE A SERIOUS SECONDARY DAMAGE MAY OCCUR, THIS FUNCTION IS LIMITED. |
| MOTOR | LIMITED | | LIMITED | |
| OLED | NOT LIMITED | — | LIMITED | |
| LED | NOT LIMITED | — | LIMITED | |

FIG. 10

LIMITATION CONTENT TABLE

| CIRCUIT BLOCK | IMPACT LEVEL A | | IMPACT LEVEL B | |
|---|---|---|---|---|
| | LIMITED OBJECT 1 | LIMITATION CONTENT a | LIMITED OBJECT 2 | LIMITATION CONTENT b |
| REACTION HEATER | LIMITED | INHIBITED | LIMITED | INHIBITED |
| MOTOR | LIMITED | INHIBITED | LIMITED | INHIBITED |
| OLED | NOT LIMITED | — | LIMITED | INHIBITED |
| LED | NOT LIMITED | — | LIMITED | VOLTAGE RISE INHIBITED (LOW LIGHTING MODE) |

FIG. 11

NOTIFICATION CONTENT TABLE

| CIRCUIT BLOCK CONTROL EVENT | IMPACT LEVEL A | | IMPACT LEVEL B | |
|---|---|---|---|---|
| | LIMITED OBJECT 1 | NOTIFICATION CONTENT I | LIMITED OBJECT 2 | NOTIFICATION CONTENT II |
| (IMMEDIATELY AFTER DETECTION) | — | A STRONG IMPACT IS DETECTED. YOUR PHONE MAY BE DAMAGED. PLEASE HAVE YOUR PHONE INSPECTED IMMEDIATELY AT A SERVICE CENTER. | — | A STRONG IMPACT IS DETECTED. YOUR PHONE MAY LEAK FUEL. PLEASE HAVE YOUR PHONE INSPECTED IMMEDIATELY AT THE NEAREST SERVICE CENTER. YOUR PHONE WILL BE AUTOMATICALLY TURNED OFF IN XX MINUTES. |
| REACTION HEATER | LIMITED | THIS FUNCTION IS LIMITED. | LIMITED | THIS FUNCTION IS LIMITED. |
| MOTOR | LIMITED | | LIMITED | |
| OLED | NOT LIMITED | — | LIMITED | |
| LED | NOT LIMITED | — | LIMITED | |

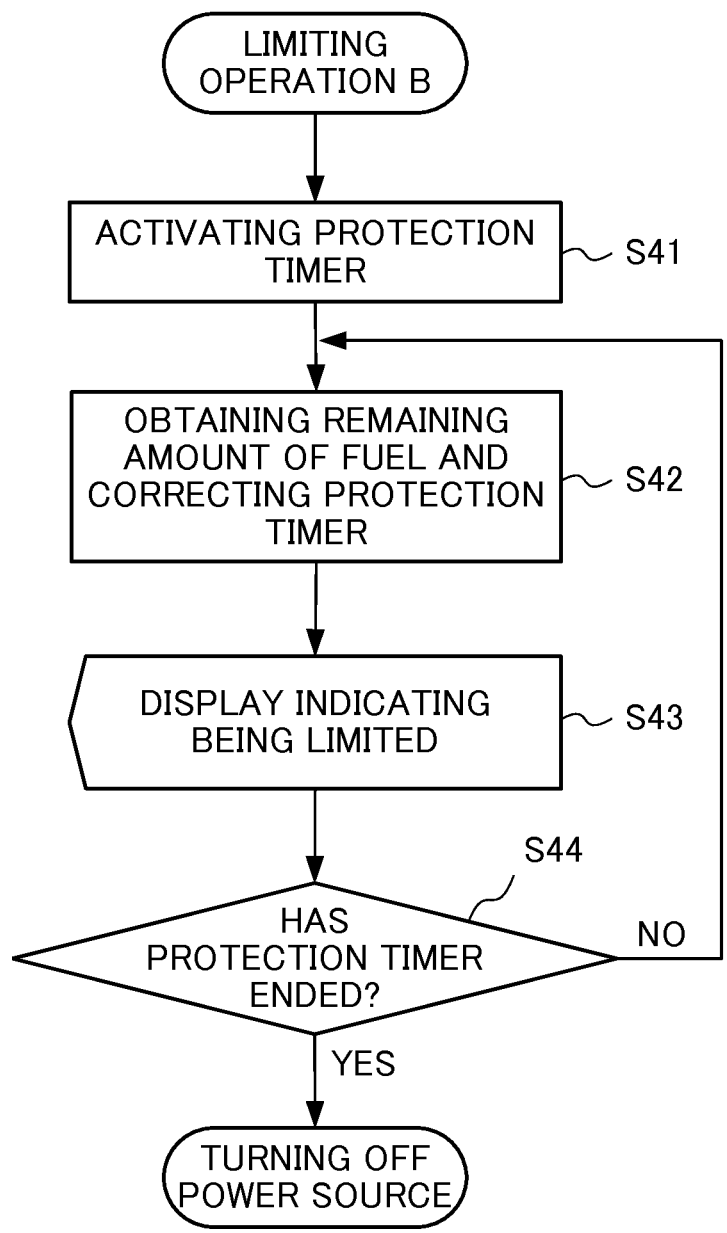

ELECTRONIC DEVICE

CROSS-REFERENCE TO RELATED APPLICATIONS

The present application is the national stage of International Application No. PCT/JP2009/059879, filed May 29, 2009, which claims priority to Japanese Application No. 2008-140332, filed May 29, 2008 and to Japanese Application No. 2009-017383, filed Jan. 28, 2009, the entire contents of which are incorporated by reference herein.

TECHNICAL FIELD

The present invention relates to an electronic device.

BACKGROUND ART

Conventionally, electronic devices such as a cellular telephone and a PDA (Personal Digital Assistant) may possibly fall accidentally due to a user using those while walking. Therefore, various countermeasures have been proposed in preparation for damages due to falling.

For example, Japanese Unexamined Patent Application, Publication No. H04-60956 discloses a device that protects data by retracting a head of a hard disk upon an impact being detected by an acceleration sensor. Furthermore, Japanese Unexamined Patent Application, Publication No. H11-225188 discloses a cellular telephone that displays on a display unit the fact that an impact occurred, if an impact sensor detects an impact which is greater than that with a set value.

Moreover, Japanese Unexamined Patent Application, Publication No. 2006-254207 discloses a mobile terminal having functions of recording how may times and where the cellular telephone has fallen, accelerations thereof, and the like, and externally outputting information thus recorded for use when performing repairs validation of a cellular telephone that had fallen.

In addition, as a fuel cell for an electronic device, a small direct methanol fuel cell (DMFC) has been known that utilizes methanol ($CH_3OH$) as a fuel. It is necessary to take into account safety for an electronic device in which such a fuel cell is mounted.

For example, Japanese Unexamined Patent Application, Publication No. 2007-80630 has proposed to separate a fuel cell mounting space in which a fuel cell is mounted and a function mounting space at which functional components of electronic devices by air tight partitions that prevent air transfer, thereby preventing fuel vapor from flowing into the function mounting space. Additionally, Japanese Unexamined Patent Application, Publication No. 2007-80630 also discloses providing an exhaust opening leading from the function mounting space to ambient air to discharge the fuel vapor from the exhaust opening at the time of fuel leakage.

DISCLOSURE OF THE INVENTION

Problems to be Solved by the Invention

Incidentally, fuel leakage of a fuel cell mounted to an electronic device often occurs in a case in which a fuel cell body or a fuel reservoir is damaged by a strong impact such as due to falling or a crash. In such a situation, the air tight partition that separates the fuel cell mounting space from the function mounting space may be damaged as well; however, it is difficult to judge the level of damage based on the appearance of the electronic device. Therefore, a user may use the electronic device continuously while fuel is leaking, without realizing these damages.

In addition, in a case in which a control circuit is damaged due to a strong impact such as falling or a crash of the mobile electronic device, recording cannot be performed as disclosed in Japanese Unexamined Patent Application Publication No. 2006-254207. Moreover, even though partially preventing the damage due to an impact, if a body of the electronic device is deformed due to this impact, a secondary damage may occur due to the contact between an electronic circuit and another conductive unit.

In view of the current situation, it is an object of the present invention to provide an electronic device that can reduce the possibility of secondary damage to an electronic circuit occurring due to impact.

Means for Solving the Problems

An electronic device according to the present invention includes: a body; an electronic circuit mounted to the body; a detection unit that detects a physical quantity that changes before an impact is applied to the body; and a control unit that limits electrical conduction to the electronic circuit in a case in which a change in a predetermined physical quantity is detected by the detection unit.

Furthermore, it is preferable that the detection unit further measures a change in a physical quantity due to an impact applied to the body.

Furthermore, it is preferable that the electronic device according to the present invention further includes a plurality of types of the electronic circuit, in which the control unit performs level judgment according to an amount of change of the physical quantity measured by the detection unit, and switches an electronic circuit to which electrical conduction is limited among the plurality of types of electronic circuits, according to a level thus judged.

Furthermore, it is preferable that the electronic device according to the present invention further includes a notification unit that performs different notification according to the level thus judged or the type of the electronic circuit.

Furthermore, it is preferable that the notification unit notifies that electrical conduction to the electronic circuit is limited, according to a use request of the electronic circuit to which electrical conduction is limited by the control unit.

Furthermore, it is preferable that the electronic device according to the present invention further includes an acceleration sensor that measures acceleration of the body in which the detection unit judges an impact level to the body based on an acceleration value measured by the acceleration sensor as the physical quantity.

Furthermore, it is preferable that the acceleration sensor is a three-axis acceleration sensor that measures acceleration values in three directions which are mutually independent.

Furthermore, it is preferable that the electric device according to the present invention further includes a storage unit that stores a judgment table in which the impact level is classified according to a value represented by a dimension of a square of acceleration in which the detection unit judges the impact level by comparing the sum of values squaring acceleration values in the three directions that the three-axis acceleration sensor measures, with a value in the judgment table stored in the storage unit.

Furthermore, it is preferable that the electric device according to the present invention further includes a storage unit that stores a judgment table in which the impact level is classified according to a value represented by jerk in which the detection unit judges the impact level by comparing jerk calculated from acceleration values in the three directions that the three-axis acceleration sensor measures, with a value in the judgment table stored in the storage unit.

Furthermore, it is preferable that the storage unit classifies and stores, in the judgment table, the impact level according to a direction of acceleration represented by a ratio of an acceleration value in a second direction to an acceleration value of a first direction and a ratio of an acceleration value of a third direction to an acceleration value of the first direction, among the three directions which are mutually independent, and the detection unit judges the impact level by comparing a magnitude and a direction of acceleration that the three-axis acceleration sensor measures with values in the judgment table stored in the storage unit.

Furthermore, it is preferable that, in a case in which a state of the acceleration value being no more than a predetermined value including zero continues for at least a predetermined time, the control unit limits electrical conduction to the electronic circuit.

Furthermore, it is preferable that the electronic device according to the present invention further includes a fuel cell unit in which the detection unit detects a possibility of fuel leakage from the fuel cell unit based on a ratio of change in a remaining amount of fuel used in the fuel cell unit.

Furthermore, it is preferable that the electronic device according to the present invention further includes a fuel cell unit in which the control unit limits electrical conduction to the electronic circuit after a predetermined time having elapsed from the time when a possibility of fuel leakage from the fuel cell unit has been detected, based on a change in the physical quantity measured by the detection unit.

Furthermore, it is preferable that the control unit determines the predetermined time according to a ratio of change in a remaining amount of fuel used in the fuel cell unit from a time when the possibility of the fuel leakage was detected by the detection unit, and limits electrical conduction to the electronic circuit after the predetermined time thus determined has elapsed.

Effects of the Invention

According to the present invention, it is possible to reduce the possibility of a secondary damage to an electronic circuit occurring due to impact.

BRIEF DESCRIPTION OF THE DRAWINGS

FIG. 3 is an impact judgment table according to the first embodiment;
FIG. 4 is a limitation content table according to the first embodiment;
FIG. 5 is a notification content table according to the first embodiment;
FIG. 10 is a limitation content table according to the second embodiment;
FIG. 11 is a notification content table according to the second embodiment;
FIG. 13 shows processing flow of a limiting operation B in a cellular telephone according to the second embodiment.

Figure 1:
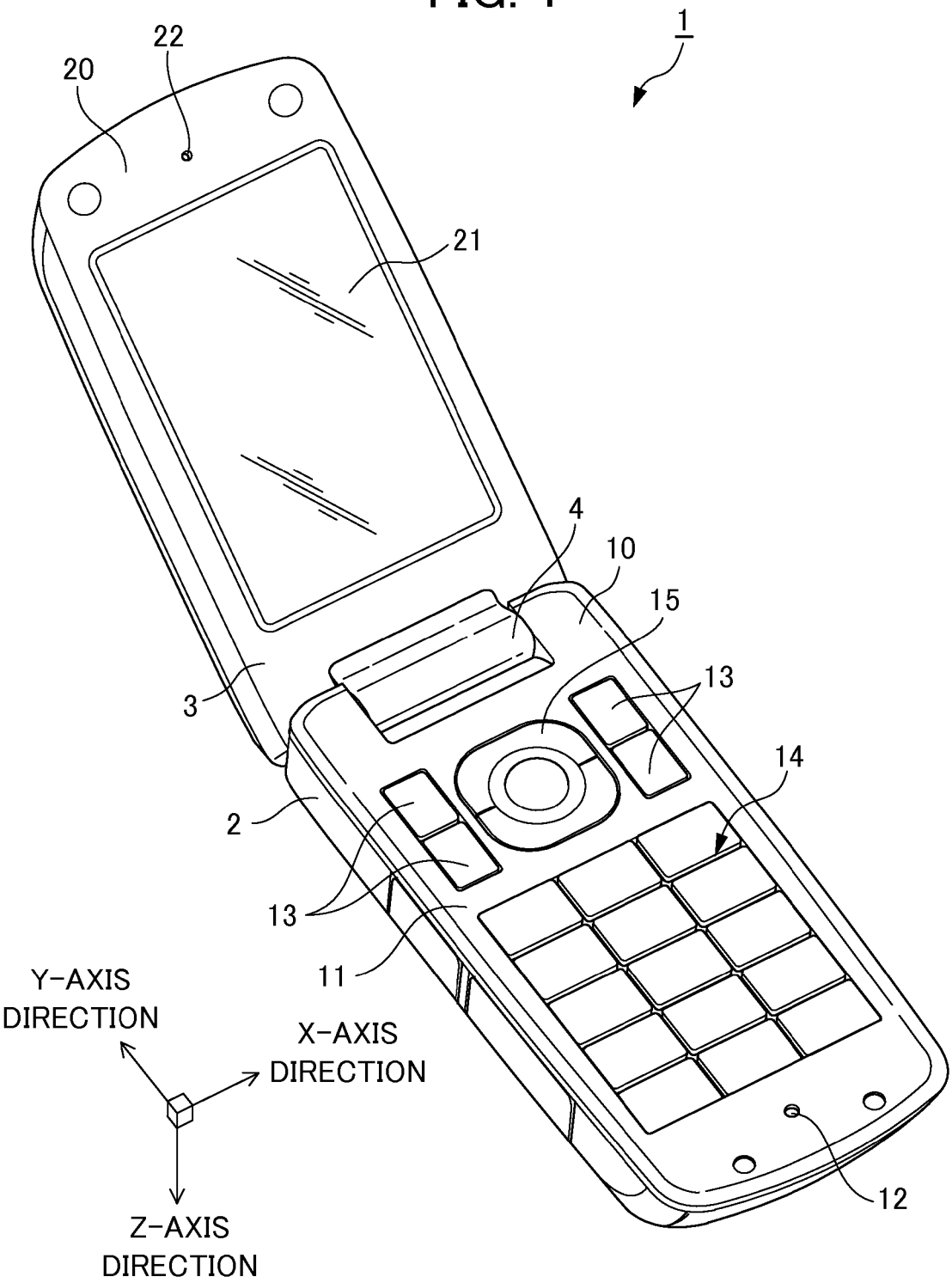
FIG. 1 is a perspective view of an external appearance of a cellular telephone according to a first embodiment.

EXPLANATION OF REFERENCE NUMERALS 1 cellular telephone (electronic device)
2 operation unit side body (body)
3 display unit side body (body)
11 operation unit
21 display unit
21a OLED (electronic circuit)
21b LED (electronic circuit, notification unit)
30 CPU (detection unit, control unit, notification unit)
31 wireless unit
32 sound unit
33 acceleration sensor (detection unit)
34 vibration motor (electronic circuit)
35 charge control unit (electronic circuit)
36 secondary battery
37 memory (storage unit)
40 fuel cell
41 fuel reservoir
42 reaction heater (electronic circuit)

PREFERRED MODE FOR CARRYING OUT THE INVENTION

First Embodiment

In the following, a first embodiment, which is an example of a preferred embodiment of the present invention, is explained. It should be noted that, although a cellular telephone 1 is explained as an example of an electronic device, the present invention is not limited thereto. For example, in addition to PHS (Personal Handy phone System) and PDA (Personal Digital Assistant), it can be applied to various electronic devices such as a personal computer and a game console.

FIG. 1 is a perspective view of an external appearance of a cellular telephone 1 according to a present embodiment. It should be noted that, although FIG. 1 illustrates a so-called foldable cellular telephone, the configuration of a cellular telephone according to the present embodiment is not limited thereto. For example, the configuration of the cellular telephone may include a slide type in which one body can be slid in one direction while both bodies are folded to be overlapping each other, a rotation type (a turn type) in which one body is rotated relative to the other body around an axial line along an overlapping direction, and a type in which an operation unit and a display unit are provided in one body without any connection portion (a straight type).

The cellular telephone 1 is configured to include an operation unit side body 2 and a display unit side body 3. The operation unit side body 2 is configured to include, in a surface unit 10, an operation unit 11 and a microphone 12 to which a sound from a user of the cellular telephone 1 during a call is inputted. The operation unit 11 is configured to include a function setting operation button 13 for operating various functions such as various setting functions, an address book, a mail function, and the like, an input operation unit 14 for inputting telephone numbers or characters for mail, and a select operation button 15 for selecting various operations, scrolling, etc.

Furthermore, the display unit side body 3 is configured to include, in a surface unit 20, a display unit 21 for displaying a variety of information and a receiver 22 that outputs a sound from the other end of the line.

In addition, an upper end portion of the operation unit side body 2 is connected to a lower end portion of the display unit side body 3 via a hinge mechanism 4. Furthermore, the cellular telephone 1 can be set to a state in which the operation unit side body 2 and the display unit side body 3 are mutually opened (an open state) and to a state in which the operation unit side body 2 and the display unit side body 3 are mutually folded (a folded state) by relatively rotating the operation unit side body 2 and the display unit side body 3 via the hinge mechanism 4.

Figure 2:
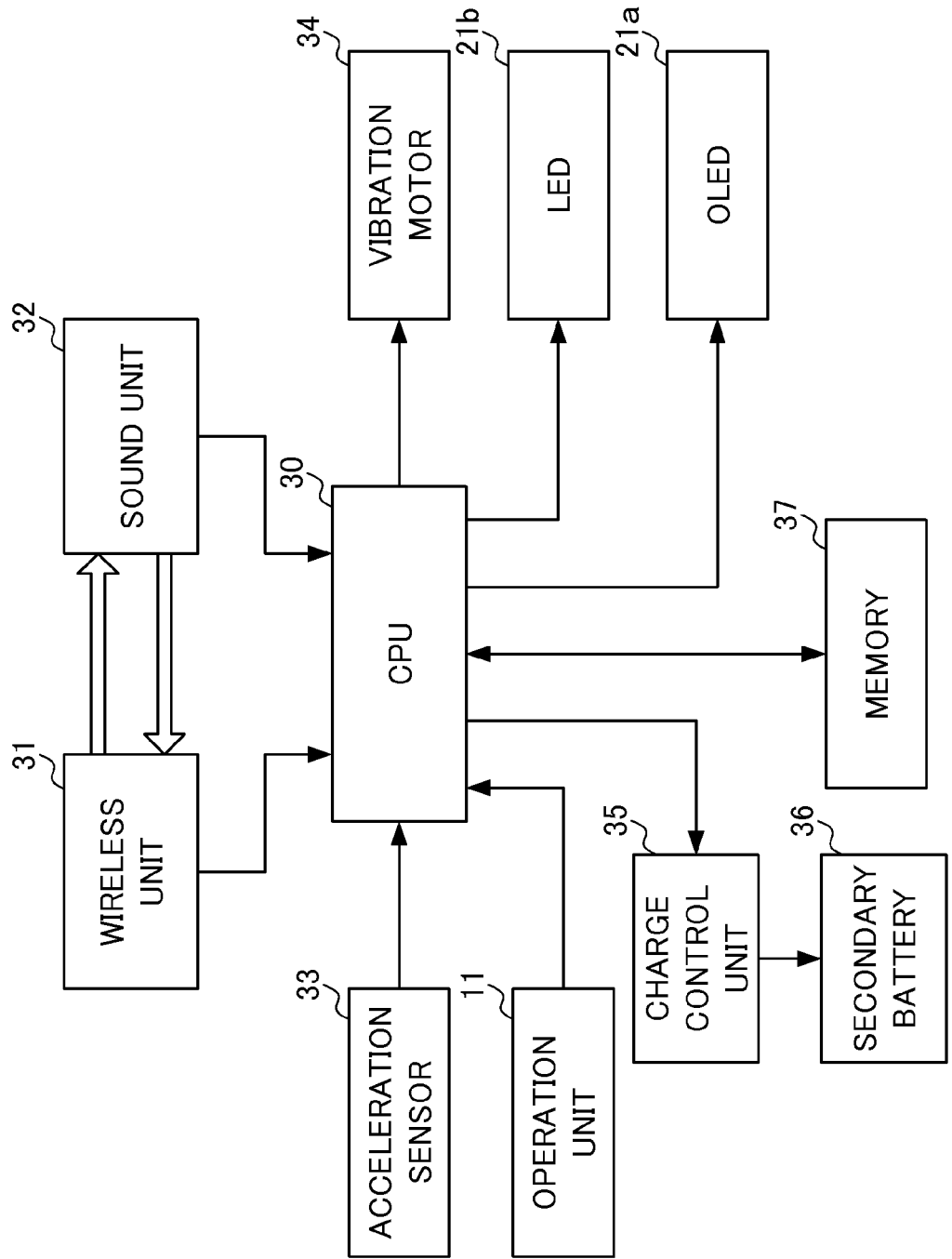
FIG. 2 is a block diagram illustrating functions of a cellular telephone according to the first embodiment.

FIG. 2 is a block diagram illustrating functions of the cellular telephone 1 according to the present embodiment. The cellular telephone 1 includes the operation unit 11, an OLED (Organic Light Emitting Diode) 21*a* and a LED (Light Emitting Diode) 21*b* as the display unit 21, a CPU 30, a wireless unit 31, a sound unit 32, an acceleration sensor 33, a vibration motor 34, a charge control unit 35, a secondary battery 36, and memory 37.

The CPU 30 controls the entire cellular telephone 1, and for example, performs a predetermined control on the display unit 21, the wireless unit 31, the sound unit 32, the vibration motor 34, or the charge control unit 35 for charging the secondary battery 36. Furthermore, the CPU 30 performs various processing upon reception of input from the operation unit 11, the acceleration sensor 33, and the like. Then, the CPU 30 controls the memory 37 upon executing processing, reads various program and data, and writes data. The CPU 30 includes a detection unit, a control unit, and a notification unit.

The display unit 21 (OLED 21*a*, LED 21*b*) performs predetermined image processing according to the control of the CPU 30. Then, image data after processing is stored in frame memory and is outputted on a screen at a predetermined timing.

The wireless unit 31 performs communication with an external device with a predetermined usable band of frequencies (for example, 800 MHz). Then, the wireless unit 31 demodulates a signal received from an antenna (not illustrated), supplies the signal after processing to the CPU 30, then performs modulation processing on the signal supplied from the CPU 30, and transmits it from the antenna to the external device.

The sound unit 32 performs predetermined sound processing on the signal supplied from the wireless unit 31 according to the control of the CPU 30, and outputs the signal after processing to the receiver 22. The receiver 22 outputs the signal supplied from the sound unit 32 to the exterior. It should be noted that this signal may be outputted from a speaker (not illustrated) in place of the receiver 22 or along with the receiver 22.

Furthermore, the sound unit 32 processes a signal inputted from the microphone 12 according to the control of the CPU 30, and outputs the signal after processing to the wireless unit 31. The wireless unit 31 performs predetermined processing on the signal supplied from the sound unit 32, and outputs the signal after processing to the antenna.

As shown in FIG. 1, the acceleration sensor 33 is of three-axis (three-dimension) type that detects acceleration in three directions (X-axis direction, Y-axis direction, and Z-axis direction) perpendicular to each other, and measures acceleration (a) based on a force applied from outside (F) and a mass (m) (acceleration (a)=force (F)/mass (m)). It should be noted that, although the acceleration sensor 33 of the present embodiment is of three-axis type, the present invention is not limited thereto. For example, it may be of single-axis type or two-axis type, or a multi-axis sensor having at least four-axis may be used for accurate detection.

Furthermore, for example, the acceleration sensor 33 measures a force applied to a predetermined mass by way of a piezoelectric device, calculates acceleration in each axis, and performs numerical data conversion and buffering. Then, the detection unit reads acceleration data thus buffered periodically. It should be noted that the acceleration sensor 33 is not limited to a piezoelectric device (piezoelectric type) and may be configured by MEMS (Micro Electro Mechanical System) type such as a piezoresistance type, a capacitance type and thermal detection type, a servo type in which a movable coil is actuated so as to place a servo back to its original position by way of feedback electric current, a strain gauge type that measures strain caused by acceleration by a strain gauge, and the like.

The vibration motor 34 causes vibration to be generated according to the control of the CPU 30, and is used for notification of incoming mail and calls or a rendering when running an application.

The charge control unit 35 is a circuit that controls charging the secondary battery 36 that supplies electric power to each unit of the cellular telephone 1.

The memory 37, for example, includes working memory and is utilized for computational processing by the CPU 30. In addition, the memory 37 includes a storage unit and specifically stores an impact judgment table (FIG. 3), a limitation content table (FIG. 4), a notification content table (FIG. 5), and the like, for example. It should be noted that the memory 37 may function as removable external memory as well.

Hereinafter, the operations of the acceleration sensor 33 and the CPU 30 are explained. The acceleration sensor 33 periodically detects a value of acceleration applied to the cellular telephone 1 as acceleration data. Then, the detection unit reads this.

The detection unit calculates the magnitude and the direction of an impact (acceleration more than a predetermined acceleration) that may be possibly caused or is actually caused based on the acceleration data thus detected. More specifically, the magnitude of an impact is calculated by squaring acceleration values of each of the X-axis direction, Y-axis direction, and Z-axis direction, and then adding all of the three values thus squared. This sum is equal to the result of the square of the amplitude of the accelerations, and thus the magnitude of an impact due to falling is judged based on this result.

Furthermore, the direction of an impact is represented with the ratio of an acceleration value in the Y-axis direction to an acceleration value in the X-axis direction (Y/X) and with the ratio of an acceleration value in the Z-axis direction to an acceleration value in the X-axis direction (Z/X). These indicate tan θ when an angle between the X-Z plane and an acceleration vector is θ, and tan φ when an angle between the X-Y plane and an acceleration vector is tan φ. It should be noted that, if it is an impact that is actually caused, the direction of the impact is obtained by detecting the direction of acceleration caused due to the impact.

It should be noted that the direction of an impact may be expressed using polar coordinates; however, since it is possible to calculate it by four arithmetic operations using tangent (tan), it is possible to reduce processing load and enhance further numerical accuracy. Then, the detection unit judges the possibility of a body being damaged by detecting the impact.

FIG. 3 shows an impact judgment table after impact occurrence according to the present embodiment. Based on this table, the detection unit judges an impact level (an acceleration level) when the cellular telephone 1 falls. It should be noted that judgment before impact occurrence of an impact level that may occur in the future may be judged based on how many seconds pass for a duration of free falling in the gravity-free state (acceleration≅0, jerk≅0). More specifically, for the impact judgment before impact occurrence, an impact that may occur in a case of the duration being from at least one second to less than three seconds is classified as substantially equivalent to an impact level A shown in FIG. 4, and an impact that may occur in a case of the duration being from at least three seconds to less than five seconds is classified as substantially equivalent to an impact level B shown in FIG. 4. That is, the impact level is judged to be higher for the longer durations.

Here, the impact levels may be respectively classified further based on the folding state (an open state or a folded state) of the cellular telephone 1 and the direction of impact. Furthermore, the impact level is divided on the basis of a magnitude and sustained period of impact, and thus, even if the same impact direction, they may be classified into "impact level A" and "impact level B", depending on the magnitudes of the impacts.

It should be noted that predetermined ranges are provided for impact directions and the impact directions which fall in an identical range are defined to have the same direction. According to the data in the first row of FIG. 3, for example, the impact directions of "1.00:1.50:-2.00" and "1.00:1.60:-2.10" are recognized to have the same direction.

In addition, according to the data in the first row of FIG. 3, if the impact from at least "1200000$G^2$" to less than "4800000$G^2$" lasts no less than "300 mSec", it is judged to be "impact level A" and if the impact of no less than "4800000$G^2$" lasts no less than "300 mSec", it is judged to be "impact level B".

In FIG. 3, although ranges of "y/x" and "z/x" are provided independently as the impact directions, the ranges are not limited thereto. For example, ranges may be provided as a predetermined polygonal face. In this case, if line segments showing impact directions intersect a predetermined triangular face, these are defined to have the same direction.

In addition, although the square of acceleration is employed as a magnitude of an impact in the abovementioned impact judgment table, the present invention is not limited thereto. For example, a magnitude of an impact may be expressed by way of jerk (temporal differentiation of acceleration). Since an impact occurring after falling generates a great acceleration, some types of acceleration sensors 33 used may exceed a detectable range thereof or the acceleration sensor 33 itself may be broken. In such cases, it may be possible to judge an impact level before the acceleration sensor 33 is broken by judging an impact level by way of jerk.

Next, in a case in which a possibility of the body having been damaged is detected, a control unit limits electrical conduction to an electronic circuit provided to the cellular telephone 1. More specifically, examples of an electrical circuit block that may cause secondary damage include the charge control unit 35 having a charge circuit, the vibration motor 34 that may cause brush spark, the OLED 21a and LED 21b having a step-up circuit. The control unit limits electrical conduction to these electronic circuit blocks. The control unit may limit electrical conduction after a predetermined lapse of time since detecting the possibility of the body having been damaged. Furthermore, the control unit switches the electronic circuit block to which electrical conduction is limited according to an impact level thus measured.

FIG. 4 is a limitation content table according to the present embodiment. Here, limitation contents according to an impact level are defined for each electronic circuit block to which electrical conduction is limited.

In FIG. 4, for example, the "charge circuit" is defined to be a limiting object for both of "impact level A" and "impact level B", and the limitation content thereof is inhibition of electrical conduction. Furthermore, although "OLED" is not a limiting object for "impact level A", electrical conduction is inhibited for "impact level B". In addition, in regard to "LED", voltage rising by the step-up circuit is inhibited for "impact level B" and a low lighting mode is set. It should be noted that cases of substantially equivalent to the abovementioned impact level A and substantially equivalent to the abovementioned impact level B before impact occurrence may also be limited similarly to this "impact level A" and "impact level B", respectively.

FIG. 5 shows a notification content table according to the present embodiment. A notification unit notifies a user of limitation content with the display unit 21 (for example, the LED 21b for which electrical conduction at a lower lighting mode is set even in the impact level B). Here, notification content is defined according to the impact level for each electronic circuit block or predetermined event.

According to FIG. 5, the notification unit, for example, notifies that impact was detected immediately after the impact was detected, and makes the user aware of the necessity of inspection. Furthermore, in a case of receiving a use request of the electronic circuit block to which electrical conduction is limited, the notification unit notifies that this electronic circuit block is limited.

Hereinafter, processing flow in the CPU 30 is explained. It should be noted that limitation of electrical conduction may begin in response to falling being detected and limitation content may be adjusted subsequently in response to an impact due to falling being detected.

Figure 6:
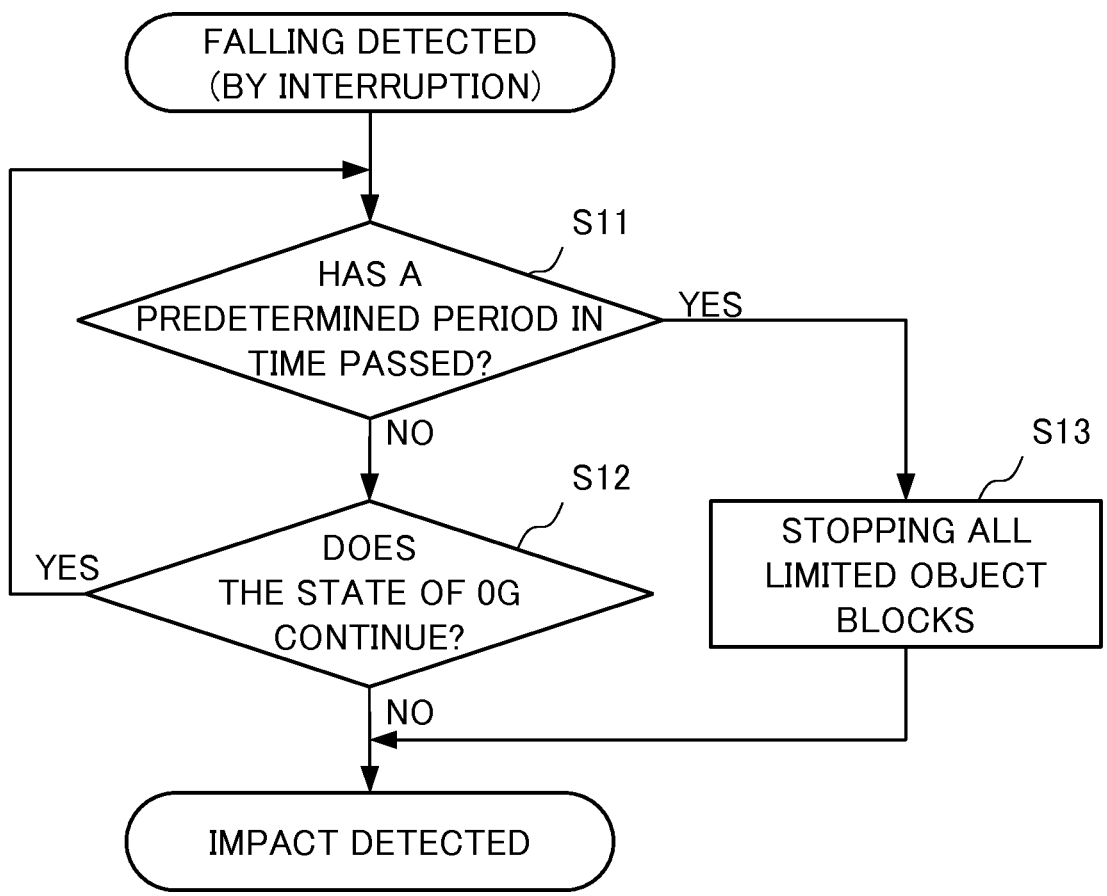
FIG. 6 shows processing flow when falling of a cellular telephone according to the first embodiment has been detected.

FIG. 6 shows processing flow when the falling of the cellular telephone 1 according to the present embodiment has been detected. In a case in which the magnitude of acceleration is detected to be "0G" or in a predetermined range around "0G" (acceleration≅0, jerk≅0), the detection unit judges that there is a possibility of being in the middle of falling, and may initiate interruption of the present processing.

In Step S11, the detection unit judges whether a predetermined time has elapsed in the state near "0G" acceleration, which indicates being in the middle of falling, based on the detected value of the acceleration sensor 33. In a case of this determination being YES, the detection unit 1 judges that the cellular telephone 1 has fallen, and the processing advances to Step S13. On the other hand, in a case of this determination being NO, only a short time (for example, less than one second) passes in the state of around "0G" acceleration, and the processing advances to Step S12 due to there also being a possibility of having been instantaneously "0G" without falling.

In Step S12, the detection unit judges whether the state of around "0G" acceleration thus detected continues. In a case of a YES determination, since it may be judged that a predetermined time has passed, the processing returns to Step S11. On the other hand, in a case of this determination being NO, since it is judged to not have fallen, electrical conduction is not limited at this time.

In Step S13, since the detection unit judges that the cellular telephone 1 is in the middle of falling, in preparation for potential future impact, the control unit stops electrical conduction, which may cause secondary damage to the electronic circuit block. It is judged to which electronic circuit block electrical conduction should be stopped, depending on the control unit according to the limitation content table.

According to the present processing, the control unit can stop the electronic circuit block in preparation for damage before the cellular telephone 1 suffers an impact due to falling. Accordingly, for example, even in a case in which the damage to the cellular telephone 1 due to the impact is severe and the cellular telephone 1 is uncontrollable, it is possible to stop the electronic circuit block that may cause secondary damage before impact being suffered.

Figure 7:
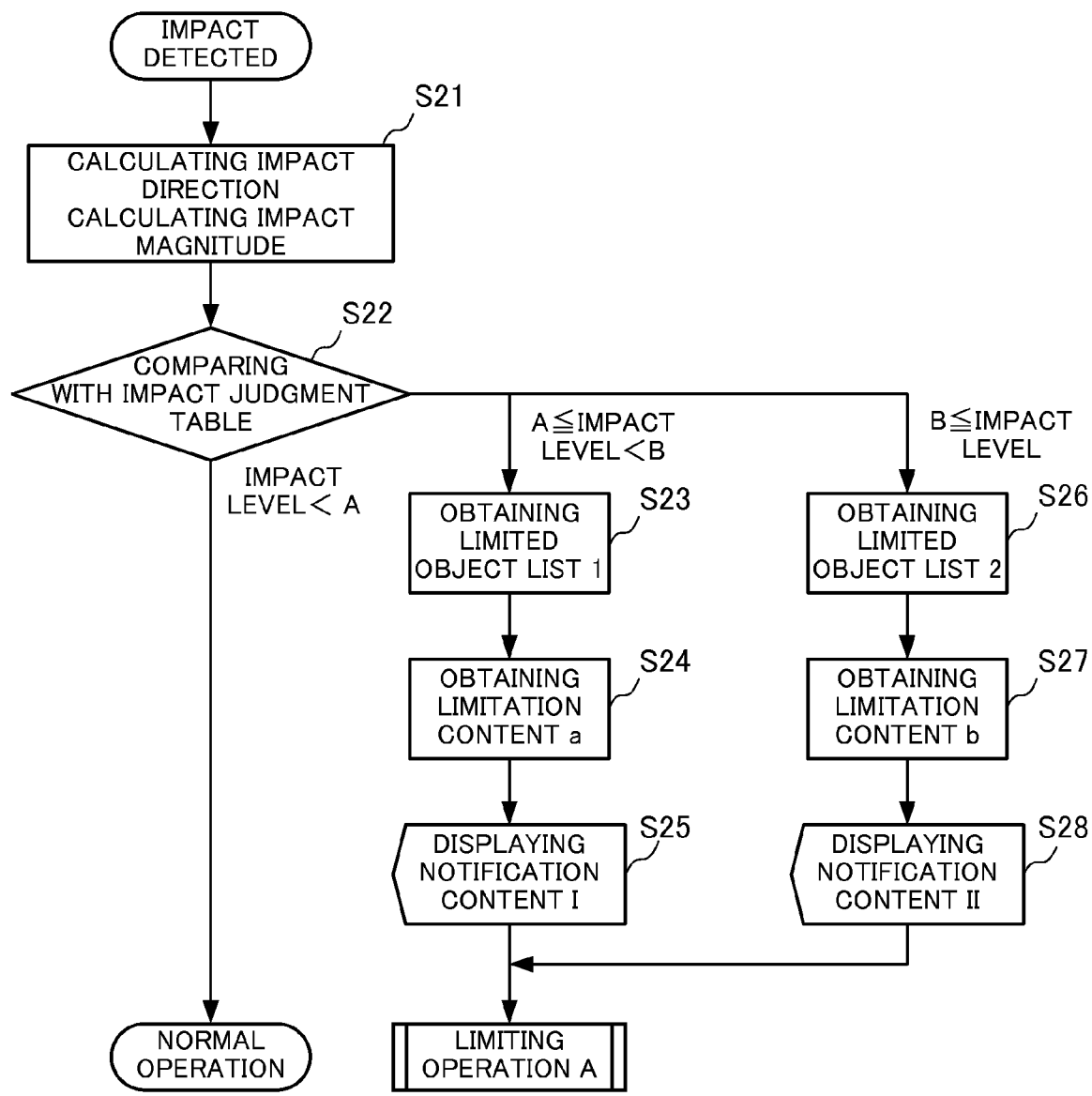
FIG. 7 shows processing flow when a cellular telephone according to the first embodiment has detected an impact.

Then, if the acceleration changes from the state thereof being around "0G" and impact is detected, the control unit starts new limitation processing (FIG. 7).

FIG. 7 shows processing flow when the cellular telephone 1 according to the present embodiment has detected an impact.

In Step S21, the detection unit calculates the direction and the magnitude of an impact based on a detected value of the acceleration sensor 33.

In Step S22, the detection unit judges an impact level by comparing the direction and magnitude of the impact calculated in Step S21 with the impact judgment table (FIG. 3). In a case in which the impact level is less than the impact level A, a limiting operation is judged to be unnecessary and normal operation is performed. In a case in which electrical conduction has been controlled by way of judgment before an impact, the limiting operation may be returned to a state in which normal operation is possible. In a case in which the impact level is at least A and less than B, the processing advances to Step S23 and the limiting operation begins or continues. In addition, in a case in which the impact level is at least B, the processing advances to Step S26 and the limiting operation begins or continues.

In Step S23, the control unit obtains a limited object list 1 corresponding to the "impact level A" from the limitation content table (FIG. 4). According to this, the electronic circuit block to which electrical conduction should be limited is determined.

In Step S24, the control unit obtains limitation content a corresponding to the electronic circuit block, which is a limited object, determined in Step S23 from the limitation content table (FIG. 4).

Figure 8:
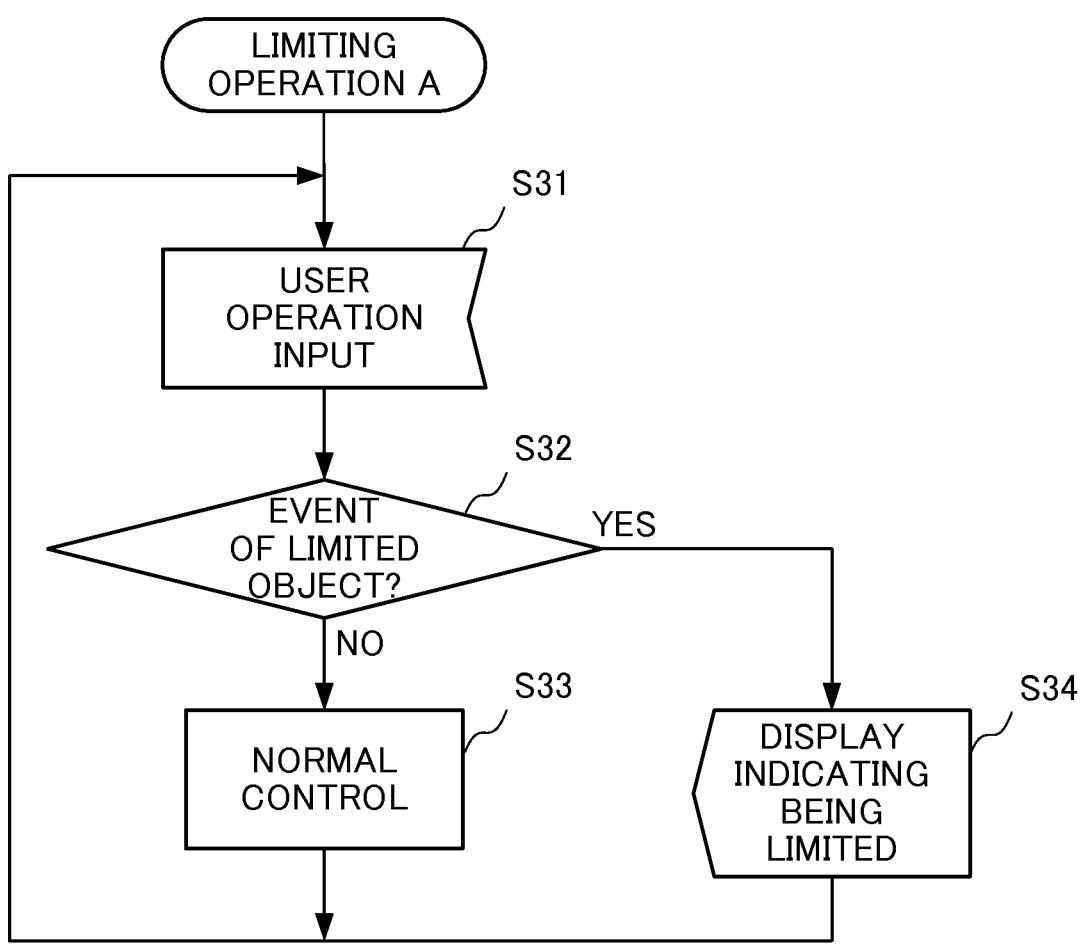
FIG. 8 shows processing flow when there has been an operation input after a cellular telephone according to the first embodiment started a limiting operation A.

In Step S25, the notification unit refers to the notification content table (FIG. 5), obtains notification content I relating to the "impact level A", and displays the notification content corresponding to the control event "immediately after detection". Then, processing of the CPU 30 advances to the limiting operation A (FIG. 8). More specifically, the control unit limits electrical conduction to the electronic circuit block, which is a limited object, according to the limitation content a thus obtained. In a case in which electrical conduction to the electronic circuit block that may cause a secondary damage is stopped due to falling being detected before an impact being detected, the control unit switches so as to limit electrical conduction to the electronic circuit block, which is a limited object, according to the limitation content a thus obtained.

In Step S26, the control unit obtains a limited object list 2 corresponding to the "impact level B" from the limitation content table (FIG. 4). With this, the electronic circuit block to which electrical conduction should be limited is determined.

In Step S27, the control unit obtains limitation content b corresponding to the electronic circuit block, which is a limited object, determined in Step S26 from the limitation content table (FIG. 4).

In Step S28, the notification unit refers to the notification content table (FIG. 5), obtains notification content II relating to the "impact level B", and displays the notification content corresponding to the control event "immediately after detection". Thereafter, processing of the CPU 30 advances to the limiting operation A (FIG. 8). More specifically, the control unit limits electrical conduction to the electronic circuit block, which is a limited object, according to the limitation content b thus obtained. In a case in which electrical conduction to the electronic circuit block that may cause secondary damage is stopped due to falling being detected before an impact being detected, the control unit switches so as to limit electrical conduction to the electronic circuit block, which is a limited object, according to the limitation content b thus obtained.

In the present embodiment, although processing advances to the limiting operation A after the notification content is displayed, the processing may advance to the limiting operation A without the notification content being displayed.

FIG. 8 shows processing flow when there has been an operation input after the cellular telephone 1 according to the present embodiment started the limiting operation A.

In Step S31, the CPU 30 receives an operation input from a user. When the cellular telephone 1 is in a normal operation, an associated electronic circuit block is caused to operate according to this operation input. On the other hand, when the cellular telephone 1 is in a limiting operation, processing advances to Step S32.

In Step S32, the control unit judges whether the operation input received in Step S31 requests an event of a limited object or an operation of an electronic circuit block, which is a limited object, based on the limitation content table (FIG. 4). In a case of this determination being YES, the processing advances to Step S34. In a case of the determination being NO, the processing advances to Step S33.

In Step S33, the control unit judges that the event thus requested does not relate to the electronic circuit block, which is a limited object, and performs a normal operation without any limitation.

In Step S34, since the event thus requested causes the electronic circuit block, which is a limited object, to operate, the control unit allows the notification content indicating being limited to be displayed, based on the notification content table (FIG. 5).

It should be noted that the limiting operation in the present processing may be released by a predetermined operation. That is, in a case in which it is judged through inspection that there is no fear of secondary damage, the limiting operation can be released by a predetermined operation and turned back to a normal operation.

Second Embodiment

In the following, a second embodiment, which is an example of a preferred embodiment of the present invention, is explained. In the present embodiment, a cellular telephone 1 includes a fuel cell unit and determines the possibility of damage to the body such that fuel leakage from the fuel cell unit may occur. It should be noted that the configurations similar to the first embodiment employ the same reference numerals and the descriptions therefor are omitted or simplified.

Figure 9:
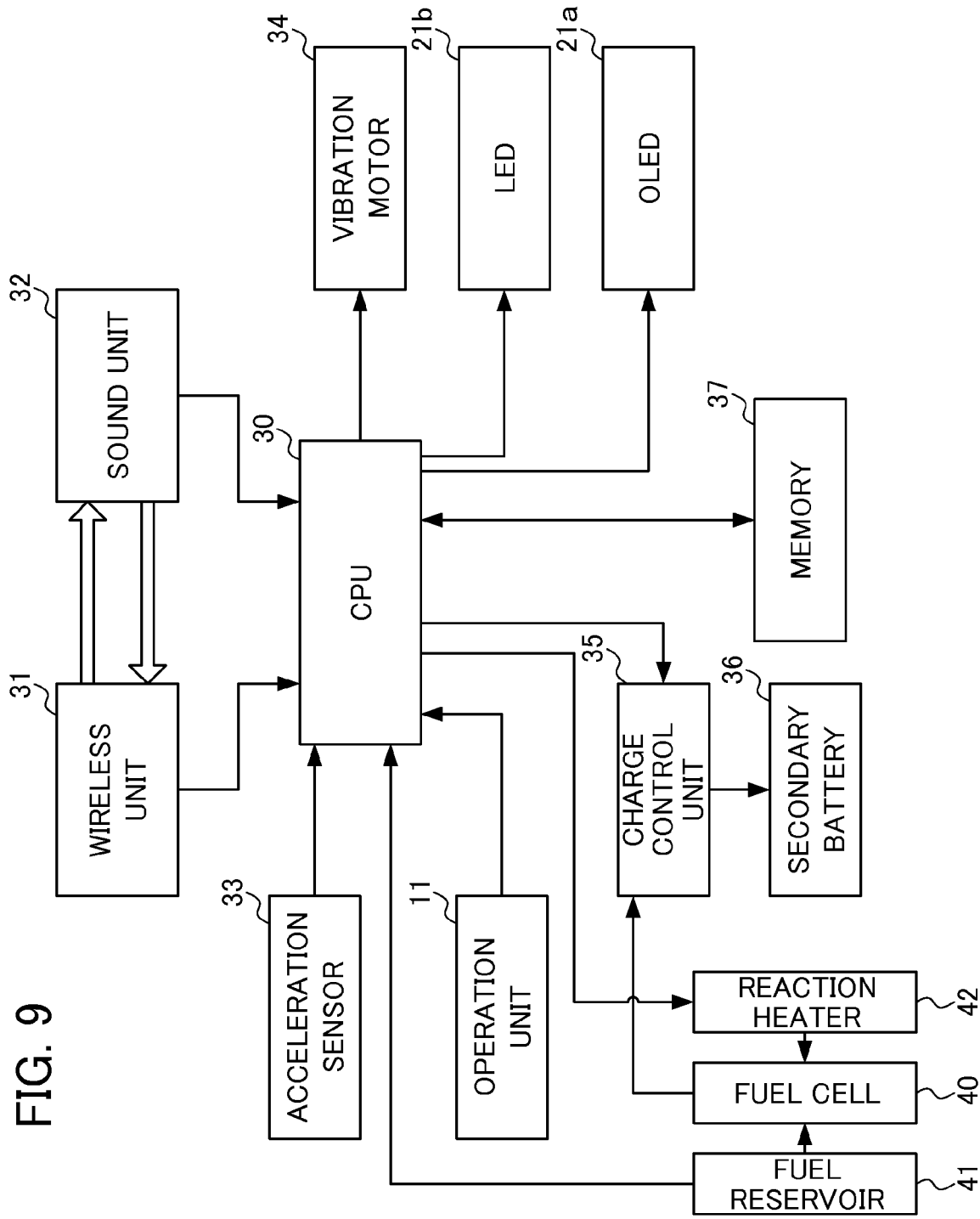
FIG. 9 is a block diagram illustrating functions of a cellular telephone according to a second embodiment.

FIG. 9 is a block diagram illustrating functions of the cellular telephone 1 according to the present embodiment. The cellular telephone 1 includes an operation unit 11, an OLED 21a and an LED 21b as a display unit 21, a CPU 30, a wireless unit 31, a sound unit 32, an acceleration sensor 33, a vibration motor 34, a charge control unit 35, a secondary battery 36, memory 37, a fuel cell 40 and a fuel reservoir 41 as a fuel cell unit, and a reaction heater 42.

The CPU 30 controls the entire cellular telephone 1, and for example, performs a predetermined control on the display unit 21, the wireless unit 31, the sound unit 32, the vibration motor 34, or the charge control unit 35 for charging the secondary battery 36, and furthermore, the reaction heater 42 to operate the fuel cell 40 and the like. Furthermore, the CPU 30 performs various processing upon reception of input from the operation unit 11, the acceleration sensor 33 or the fuel reservoir 41, and the like. Then, the CPU 30 controls the memory 37 upon executing processing, reads various programs and data, and writes data. The CPU 30 includes a detection unit, a control unit, and a notification unit.

The fuel cell 40 generates electricity by supplying methanol as fuel from the fuel reservoir 41, and inducing a chemical reaction by way of the heat generated by the reaction heater 42. The electricity generated by this fuel cell 40 is charged to a secondary battery 36 via a charge control unit 35.

Here, a remaining amount of the fuel stored in the fuel reservoir 41 is appropriately read by the CPU 30, and the amount of electric energy that can be retrieved from the fuel cell 40 is judged. In addition, the reaction heater 42 operates based on a control signal from the CPU 30, and controls electrical power generation by the fuel cell 40.

Hereinafter, the operations of the acceleration sensor 33 and the CPU 30 are explained. The acceleration sensor 33 periodically detects a value of acceleration applied to the cellular telephone 1 as acceleration data. Then, the detection unit reads this.

The detection unit detects a physical quantity immediately before or at the time when an impact that may cause fuel leakage occurs. More specifically, the detection unit judges an impact level (an acceleration level) when the cellular telephone 1 falls based on the impact judgment table (FIG. 3).

Here, the impact level A refers to an impact level to such an extent that a body of the cellular telephone 1 may be damaged or might be damaged and a circuit thereof may be damaged. Furthermore, the impact level B refers to an impact level to such an extent that a body of the cellular telephone 1 is damaged and fuel therein may leak. It should be noted that the judgment of an impact level that may occur in the future before impact occurrence may be judged based on how many seconds pass for a duration of free fall in the gravity-free state (acceleration≅0, jerk≅0). More specifically, for the impact judgment before impact occurrence, an impact that may occur in a case of the duration being from at least one second to less than three seconds is classified as substantially equivalent to an impact level A, and an impact that may occur in a case of the duration being from at least three seconds to less than five seconds is classified as substantially equivalent to an impact level B. That is, the impact level is judged to be higher for longer durations.

Next, in a case in which the possibility of fuel leakage has been detected, the control unit limits electrical conduction to an electronic circuit included in the cellular telephone 1. Specific examples of the electronic circuit blocks that are targets for limitation include, for example, the reaction heater 42, a vibration motor 34, OLED 21a and LED 21b having a step-up circuit, and the like. The control unit limits electrical conduction to these electronic circuit blocks. The control unit may limit electrical conduction after a predetermined lapse of time since detecting the possibility of fuel leakage. Furthermore, the control unit switches the electronic circuit block to which electrical conduction is limited according to an impact level thus measured.

FIG. 10 shows a limitation content table according to the present embodiment. Here, limitation contents according to an impact level are defined for each electronic circuit block to which electrical conduction is limited.

In FIG. 10, for example, the "reaction heater" is defined to be a limited object for both of "impact level A" and "impact level B", and the limitation content thereof is inhibition of electrical conduction. Furthermore, although "OLED" is not a limited object for "impact level A", electrical conduction is inhibited for "impact level B". In addition, in regard to "LED", voltage rising by the step-up circuit is inhibited for "impact level B" and a low lighting mode is set.

FIG. 11 is a notification content table according to the present embodiment. A notification unit notifies a user of limitation content with the display unit 21 (for example, the LED 21b for which electrical conduction at a lower lighting mode is set even in the impact level B). Here, notification content is defined according to the impact level for each electronic circuit block or predetermined event.

According to FIG. 11, the notification unit, for example, notifies that impact was detected immediately after the impact was detected, and makes the user aware of the necessity of inspection. Furthermore, in a case of receiving a use request of the electronic circuit block to which electrical conduction is limited, the notification unit notifies that this electronic circuit block is limited.

Furthermore, in a case of the impact level B being detected, since fuel leakage may be caused, the CPU 30 turns off the power source of the cellular telephone 1 after a predetermined lapse of time (for example, a few minutes). Furthermore, since the notification unit notifies that the power source will be turned off after a predetermined lapse of time, it is possible to provide a time extension for the user to perform certain operations until the power source is turned off.

Hereinafter, processing flow in the CPU 30 is explained. It should be noted that limitation of electrical conduction may begin in response to falling being detected, and limitation content is adjusted subsequently in response to the impact due to the falling being detected.

That is, as shown in FIG. 6, when a predetermined period of time has passed in a state around "0G" acceleration and it is judged by the detection unit that the cellular telephone 1 is in the middle of falling, the control unit stops electrical conduction to a predetermined electronic circuit block.

According to the present processing, the control unit can stop the electronic circuit block in preparation for damage before the cellular telephone 1 suffers an impact due to falling. Accordingly, for example, even in a case in which the damage to the cellular telephone 1 due to the impact is severe and the cellular telephone 1 is uncontrollable, it is possible to stop the electronic circuit block that may cause secondary damage before impact being suffered.

Figure 12:
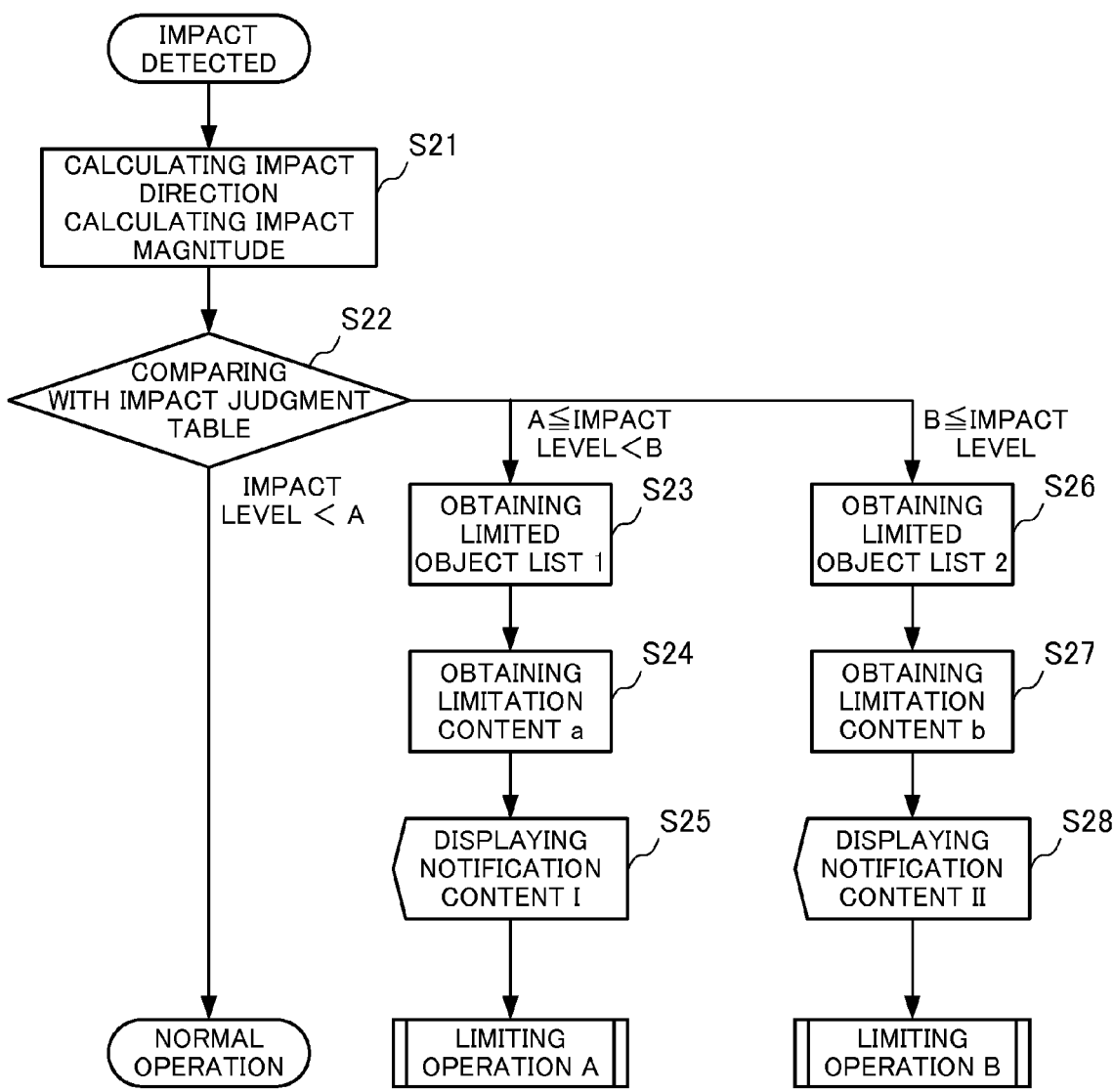
FIG. 12 shows processing flow when a cellular telephone according to the second embodiment has detected an impact.

Thereafter, if the acceleration changes from the state of being around "0G" and impact is detected, the control unit starts new limitation processing (FIG. 12).

FIG. 12 shows processing flow when the cellular telephone 1 according to the present embodiment has detected an impact. In the present processing, a limiting operation after Step S28 is different from the processing of the first embodiment (FIG. 7).

In Step S21, the detection unit calculates the direction and the magnitude of an impact based on a detected value of the acceleration sensor 33.

In Step S22, the detection unit judges an impact level by comparing the direction and magnitude of the impact calculated in Step S21 with the impact judgment table (FIG. 3). In a case in which the impact level is less than the impact level A, a limiting operation is judged to be unnecessary and normal operation is performed. In a case in which the impact level is at least A and less than B, the processing advances to Step S23 and the limiting operation begins. In addition, in a case in which the impact level is at least B, the processing advances to Step S26 and the limiting operation begins.

In Step S23, the control unit obtains a limited object list 1 corresponding to the "impact level A" from the limitation content table (FIG. 10). With this, the electronic circuit block to which electrical conduction should be limited is determined.

In Step S24, the control unit obtains limitation content a corresponding to the electronic circuit block, which is a limited object, determined in Step S23 from the limitation content table (FIG. 10).

In Step S25, the notification unit refers to the notification content table (FIG. 11), obtains notification content I relating to the "impact level A", and displays the notification content corresponding to the control event "immediately after detection". Then, processing of the CPU 30 advances to the limiting operation A (FIG. 8). More specifically, the control unit limits electrical conduction to the electronic circuit block, which is a limited object, according to the limitation content a thus obtained. In a case in which electrical conduction to a predetermined electronic circuit block is stopped due to falling being detected before an impact being detected, the control unit switches so as to limit electrical conduction to the electronic circuit block, which is a limited object, according to the limitation content a thus obtained.

In Step S26, the control unit obtains a limited object list 2 corresponding to the "impact level B" from the limitation content table (FIG. 10). With this, the electronic circuit block to which electrical conduction should be limited is determined.

In Step S27, the control unit obtains limitation content b corresponding to the electronic circuit block, which is a limited object, determined in Step S26 from the limitation content table (FIG. 10).

In Step S28, the notification unit refers to the notification content table (FIG. 11), obtains notification content II relating to the "impact level B", and displays the notification content corresponding to the control event "immediately after detection". Thereafter, processing of the CPU 30 advances to the limiting operation B (FIG. 13). More specifically, the control unit limits electrical conduction to the electronic circuit block, which is a limited object, according to the limitation content a thus obtained. In a case in which electrical conduction to a predetermined electronic circuit block is stopped due to falling being detected before an impact being detected, the control unit switches so as to limit electrical conduction to the electronic circuit block, which is a limited object, according to the limitation content b thus obtained.

In the present embodiment, although processing advances to the limiting operation A or B after the notification content is displayed, the processing may advance to the limiting operation A or B without the notification content being displayed.

FIG. 13 shows processing flow of the limiting operation B in the cellular telephone 1 according to the present embodiment.

In Step S41, the control unit activates a protection timer that measures a predetermined period in time as an available time until electrical conduction should be stopped.

In Step S42, the control unit obtains a remaining amount of fuel from the fuel reservoir 41 and corrects a measured time of the protection timer based on an amount of change in the remaining amount thereof. That is, in a case in which the remaining amount of fuel is decreasing rapidly, since it can be judged that the fuel leaks more rapidly than assumed, a predetermined period in time until turning off the cellular telephone 1 is shortened.

In Step S43, as in the case in which an operation input is performed after the limiting operation A (FIG. 8) started, the notification unit displays notification content indicating that the electronic circuit block is being limited during a period until a predetermined time elapses.

In Step S44, the control unit judges whether the protection timer that measures a predetermined period in time has ended. In a case of this determination being YES, the power of the cellular telephone 1 is turned off. On the other hand, in a case of the determination being NO, it is judged to still be within the time extension, and the processing returns to Step S42.

In the present embodiment, although the possibility of fuel leakage is detected by determining impact to the body by way of the acceleration sensor 33, the present invention is not limited thereto. For example, the possibility of fuel leakage may be detected based on a ratio of change of the remaining amount of fuel by monitoring the remaining amount of fuel obtained from the fuel reservoir 41. In this case, it is unnecessary to use the acceleration sensor 33, and both an impact level based on the acceleration value and a change in the remaining amount of fuel may be judgment criteria for limiting operations.

In addition, although, in the abovementioned embodiment, the impact level is divided into the two types, i.e. the impact levels A and B, the impact level may be further divided into several types. In this case, it is possible to define a limiting operation more precisely.

Although embodiments of the present invention are described above, the present invention is not limited to the embodiments described above. In addition, the effects described in the embodiments of the present invention are simply listed as the most preferable effects exerted from the present invention, and the effects by the present invention are not limited to those described in the embodiments of the present invention.

The invention claimed is:

1. An electronic device comprising:
   a body;
   an electronic circuit mounted to the body;
   a detection unit that detects a physical quantity that changes before an impact is applied to the body;
   a control unit that limits electrical conduction to the electronic circuit in a case in which a change in a predetermined physical quantity is detected by the detection unit;
   a plurality of types of the electronic circuit,
   wherein the control unit performs level judgment according to an amount of change of the physical quantity measured by the detection unit, and switches an electronic circuit to which electrical conduction is limited among the plurality of types of electronic circuits, according to a level thus judged; and
   a notification unit that performs different notification according to the level thus judged or the type of the electronic circuit.

2. The electronic device according to claim 1, wherein the detection unit further measures a change in a physical quantity due to an impact applied to the body.

3. The electronic device according to claim 1, wherein the notification unit notifies that electrical conduction to the electronic circuit is limited, according to a use request of the electronic circuit to which electrical conduction is limited by the control unit.

4. The electronic device according to claim 1, further comprising an acceleration sensor that measures acceleration of the body,
wherein the detection unit judges an impact level to the body based on an acceleration value measured by the acceleration sensor as the physical quantity.

5. The electronic device according to claim 4, wherein the acceleration sensor is a three-axis acceleration sensor that measures acceleration values in three directions which are mutually independent.

6. The electronic device according to claim 5, further comprising a storage unit that stores a judgment table in which the impact level is classified according to a value represented by a dimension of a square of acceleration,
wherein the detection unit judges the impact level by comparing the sum of values squaring acceleration values in the three directions that the three-axis acceleration sensor measures, with a value in the judgment table stored in the storage unit.

7. The electronic device according to claim 5, further comprising a storage unit that stores a judgment table in which the impact level is classified according to a value represented by jerk,
wherein the detection unit judges the impact level by comparing jerk calculated from acceleration values in the three directions that the three-axis acceleration sensor measures, with a value in the judgment table stored in the storage unit.

8. The electronic device according to claim 6, wherein the storage unit classifies and stores, in the judgment table, the impact level according to a direction of acceleration represented by a ratio of an acceleration value in a second direction to an acceleration value of a first direction and a ratio of an acceleration value of a third direction to an acceleration value of the first direction, among the three directions which are mutually independent, and
wherein the detection unit judges the impact level by comparing a magnitude and a direction of acceleration that the three-axis acceleration sensor measures with values in the judgment table stored in the storage unit.

9. The electronic device according to claim 7, wherein the storage unit classifies and stores, in the judgment table, the impact level according to a direction of acceleration represented by a ratio of an acceleration value in a second direction to an acceleration value of a first direction and a ratio of an acceleration value of a third direction to an acceleration value of the first direction, among the three directions which are mutually independent, and
wherein the detection unit judges the impact level by comparing a magnitude and a direction of acceleration that the three-axis acceleration sensor measures with values in the judgment table stored in the storage unit.

10. The electronic device according to claim 5, wherein, in a case in which a state of the acceleration value being no more than a predetermined value including zero continues for at least a predetermined time, the control unit limits electrical conduction to the electronic circuit.

11. The electronic device according to claim 2,
further comprising a fuel cell unit,
wherein the detection unit detects a possibility of fuel leakage from the fuel cell unit based on a ratio of change in a remaining amount of fuel used in the fuel cell unit.

12. The electronic device according to claim 2,
further comprising a fuel cell unit,
wherein the control unit limits electrical conduction to the electronic circuit after a predetermined time having elapsed from the time when a possibility of fuel leakage from the fuel cell unit has been detected, based on a change in the physical quantity measured by the detection unit.

13. The electronic device according to claim 12, wherein the control unit determines the predetermined time according to a ratio of change in a remaining amount of fuel used in the fuel cell unit from a time when the possibility of the fuel leakage was detected by the detection unit, and limits electrical conduction to the electronic circuit after the predetermined time thus determined has elapsed.

* * * * *